(12) United States Patent
Kitagawa (10) Patent No.: US 7,386,461 B2
(45) Date of Patent: Jun. 10, 2008

(54) METHOD FOR PROVIDING FORTUNE INFORMATION

(76) Inventor: Masahiko Kitagawa, Kamisoshigaya 7-6-2-101, Setagayu-ku, Tokyo 157-0065 (JP)

( * ) Notice: Subject to any disclaimer, the term of this patent is extended or adjusted under 35 U.S.C. 154(b) by 1363 days.

(21) Appl. No.: 10/204,652

(22) PCT Filed: Sep. 6, 2001

(86) PCT No.: PCT/JP01/07726

§ 371 (c)(1),
(2), (4) Date: Aug. 21, 2002

(87) PCT Pub. No.: WO02/051513

PCT Pub. Date: Jul. 4, 2002

(65) Prior Publication Data

US 2003/0023457 A1    Jan. 30, 2003

(30) Foreign Application Priority Data

Dec. 22, 2000   (JP) ............................ 2000-390618

(51) Int. Cl.
*G06Q 99/00* (2006.01)
(52) U.S. Cl. ....................................................... 705/1
(58) Field of Classification Search ................ 705/1
See application file for complete search history.

(56) References Cited

U.S. PATENT DOCUMENTS

| | | | |
|---|---|---|---|
| 5,719,619 A * | 2/1998 | Hattori et al. ................. 725/24 |
| 5,909,671 A | 6/1999 | Byford et al. ................. 705/26 |
| 5,990,805 A | 11/1999 | Wicks et al. ................. 340/7.48 |
| 5,999,126 A * | 12/1999 | Ito ............................ 342/357.1 |
| 6,111,541 A * | 8/2000 | Karmel ..................... 342/357.13 |
| 6,256,498 B1* | 7/2001 | Ludwig ....................... 455/433 |
| 6,275,695 B1* | 8/2001 | Obhan ......................... 455/423 |
| 6,523,039 B1* | 2/2003 | Chen ........................... 707/100 |

(Continued)

FOREIGN PATENT DOCUMENTS

WO    WO94/28491    12/1994

(Continued)

OTHER PUBLICATIONS www.astrology.com, Retrieved from web archive Wayback Machine <www.archive.org>, date range: Mar. 1, 2000-Oct. 18, 2000.*

*Primary Examiner*—Jonathan Ouellette
(74) *Attorney, Agent, or Firm*—Kenneth Wator; Wator & Kipnes, P.C.

(57) ABSTRACT

This invention provides methods of supplying information for fortunetelling wherein a user can receive useful information by accessing a fortunetelling site. A server delivers the fortune information to a client based on the presetting of the delivery at a fixed time everyday, the delivery at every hour, the delivery when the user's biorhythm is low, and the delivery when the fortune result is ill or good. When the delivery time is decided a computer calculates the fortune result out and the server delivers the result. When the delivery time is not decided the computer is preset to perform a fortunetelling and to calculate the fortune result where the computer judges good or ill result of the fortunetelling and thus the server delivers the fortune result in compliance with the judgment of the computer.

33 Claims, 5 Drawing Sheets

U.S. PATENT DOCUMENTS

2001/0007825 A1* 7/2001 Harada et al. .................. 463/7
2001/0009426 A1* 7/2001 Murata ....................... 345/837
2001/0030624 A1* 10/2001 Schwoegler ........... 342/357.13

FOREIGN PATENT DOCUMENTS

WO WO95/34864 12/1995
WO WO 00/36521 6/2000

* cited by examiner

METHOD FOR PROVIDING FORTUNE INFORMATION

RELATED APPLICATIONS

The present Application is related to, and claims priority from PCT Application No. PCT/JP01/07726, filed 6 Sep. 2001, which claims priority from Japanese Patent Application No. 2000-390618, filed 22 Dec. 2000. The teachings of these Applications are incorporated herein by reference to the extent they do not conflict with the present Application.

FIELD OF THE INVENTION

This invention relates to a method of supplying information for fortunetelling through a use of an internet connection, LAN, WAN, mobile communication system or others.

BACKGROUND OF THE INVENTION

In the present stage where internet communication is quite popular among people, many internet services used have their sites for furnishing "Fortunetelling" contents, through which it is easy for internet users to access the fortunetelling site and obtain their own fortunes. A user who wants to check his fortune may access the site and input his own data such as his name, his date of birth and the like, according to a format indicated on a browser, and thus the computer site performs its fortunetelling in accordance with the obtained data, and then it displays the fortune result on the browser after proper calculation, wherein the user can obtain the relative result.

Nowadays, however, these fortunetelling sites are flooded, resulting in similar distributions of fortunetelling data without any significant difference. Therefore, for these sites, it is necessary to furnish extra and special data supplements to obtain many visitors on the site.

Recently, even a terminal of mobile communication machines such as PHS or a handy phone can enjoy the internet services, and there are many fortunetelling sites for these services. However, the contact to the site by the terminal needs the operation of a user's thumb only, which is very troublesome and difficult, and therefore on this site services, only limited information for the fortunetelling can be supplied.

SUMMARY OF THE INVENTION

The present invention has an object to resolve problems as discussed above, and it provides a method of supplying information for fortunetelling in more useful manners to all users of the relative sites. In other words, this method of supplying information for fortunetelling provides a server, equipped with a database storing all user's data, another database storing fundamental data of fortunetelling, and a computer calculating results of the fortunetelling for the user's own, by the fundamental data being read out based on the user's data in accordance with principles of the fortunetelling. The computer calculates the result of fortunetelling at a fixed time as required, the result is then distributed to a client device, such as a cellular phone of a user, for example, which can be operated by a user to access the server. Once the user visits the site and inputs his own data and registers the same on the site, the last information for his fortune is regularly and automatically supplied from the site side to a terminal at the user's side. In other words this invention provides an active system.

As the user's data, in case of astrology, his date of birth, his time of birth and his place of birth are adopted, while as the fundamental data, in case of astrology, revolving data of stars such as planets and satellites of the solar system and meaningful messages of each star, revolving data of constellations such as zodiac and meaningful messages of such constellations, and meaningful messages of the zodiac houses are adopted. These data are assembled to make a horoscope, whereon the message for the user's own horoscope is produced and thus the result for fortunetelling is supplied. Such method of fortunetelling by computer is disclosed in Japanese Patent Laid Open No. 1997-627.

The fixed time at which a computer calculates the result of fortunetelling can be decided both by the site side and the user side. For example, once a day at 8:00 AM or every hour in a day can be decided. The supplying time can be decided by the site side, but it is preferable that this supplying time is decided by the through the client device at the user's side. In case the user wants to know the last fortune as promptly as possible, the most appropriate time for the computer to calculate the result of the fortunetelling can be set at a fixed interval such as every 30 minutes or every hour, and a site server delivers the results of fortunetelling whenever a site computer calculates the same. Also, a programming by the computer judging whether the fortune result is of good luck or bad luck can be prepared. In this case, the server immediately delivers a result of fortunetelling to the user when a result either corresponds to good or bad luck, it being very beneficial (useful) for the user since this method can provide good or bad information as promptly as possible. In order to recognize whether the result is good or bad luck, the computer can judge a positive or negative sentence or languages in a message which are included in the fortunetelling result by use of flags.

In this method of the present invention, the client device which can be operated by a user can adopt a terminal connected to the network such as a telephone, personal computer, PDA, interactive TV, personal computer used in a company, a data terminal prepared at some convenience store and a terminal of a mobile communication system. When the user is contacted by his terminal of mobile communication which is devised to show his present user position data by its location registration function, the mobile communication system can offer his present position data to the server, whereon this position data can be added to the user's data. Thus the computer can calculate the result of fortunetelling taking into consideration the user's position. In recent days, the mobile terminal equipped with GPS (Global Positioning System) receiving function is available, so it is possible for a client device to be equipped with a GPS receiving function, for example, and therefore the user's position data by GPS receiving function can be also supplied to the server from the client device, whereupon this position data can be added to the data of the server. Thus the computer can calculate the result of fortunetelling taking into consideration the user's position.

For instance, in astrology, connections between the geographic position or location of a subject person or user for the fortunetelling and the present revolving situations of stars become very important, and therefore the present user position can be an important factor to supply accurate fortune information. Further, the site computer calculates fortunetelling results when a user's position changes far from a previous fixed position, the changes of fortunetelling being in accordance with the changes in position can also be supplied. Still further, setting a site server to deliver results of fortunetelling whenever a site computer calculates the results is beneficial to the user. Also, a site computer calculates results of fortunetelling when a position of the user is changed far from a previous fixed position and judges the results of the fortunetelling. A site server delivers the results of the fortunetelling when the user position is moving in an astrologically positive or negative direction depends on a user's setting. A computer detects a direction of user movement compared with a former position of the user whenever the position of the user is changed far from a previous fixed position, and calculates when this direction is judged astrologically positive or negative, relative messages are delivered to a client device from a site server. Changes in a user's position can be determined, for example, by a distance changed such as when a cell space of a base station of a mobile communication system changes (hand-off), or by use of a GPS mechanism providing distance moved in kilometers or relative latitude and longitude (degree, minute, second).

In the sites as above explained, a server equipped with a database storing some characteristic data of some particular fortunetellers, wherein principles of fortunetelling are changed in compliance with the characteristic data in connection with a computer calculating the results of fortunetelling, so that the user can obtain the results of fortunetelling in accordance with characteristics of the fortuneteller selected by user preference. For instance, in case of the astrology, when the data obtained by assembling the constellations, planets and zodiac houses enters into a boundary of the other data, how to locate these data for consideration will differ by each fortuneteller's experience and his practical intuition. On the other side, degrees of star meanings and constellation meanings can be also judged by different manners. In order to judge equally as said above, the characteristics of the particular fortuneteller are recorded as data memory, so that a flow of fortune calculation is adjusted. For example, the adjustment is made for respectively, when an angle of a given star in reference to another star attains a given value, the zodiac should be adopted in a former house, whereas if the aspect or angle changes, the zodiac should be adopted in a different house.

As in the above mentioned method of the present invention, the message of results of the fortunetelling can be played into sound or vocally provided. In this case, the sound played in the server is supplied in normal telephone function. Alternatively, the sound data such as the sound file is delivered from the server, and the sound data can be reproduced into sound by the client device or other known mechanism. The sound can be played according to characteristics of a particular character, for example a voice of some talent and his way of speaking such as a tone of voice and an accent, in this manner the user can enjoy listening to the fortunetelling information.

A site computer searches another user's data in a database, which is congenial or compatible with a user on the client device based on the results of fortunetelling, and delivers address data of the searched congenial user to the user on the client device, if available. Thus, a partner can be selected according to the fortunes in the present time or the day, and thus the contact information such as a telephone number or an e-mail address are provided.

DETAILED DESCRIPTIONS OF PREFERRED EMBODIMENT

Figure 1:
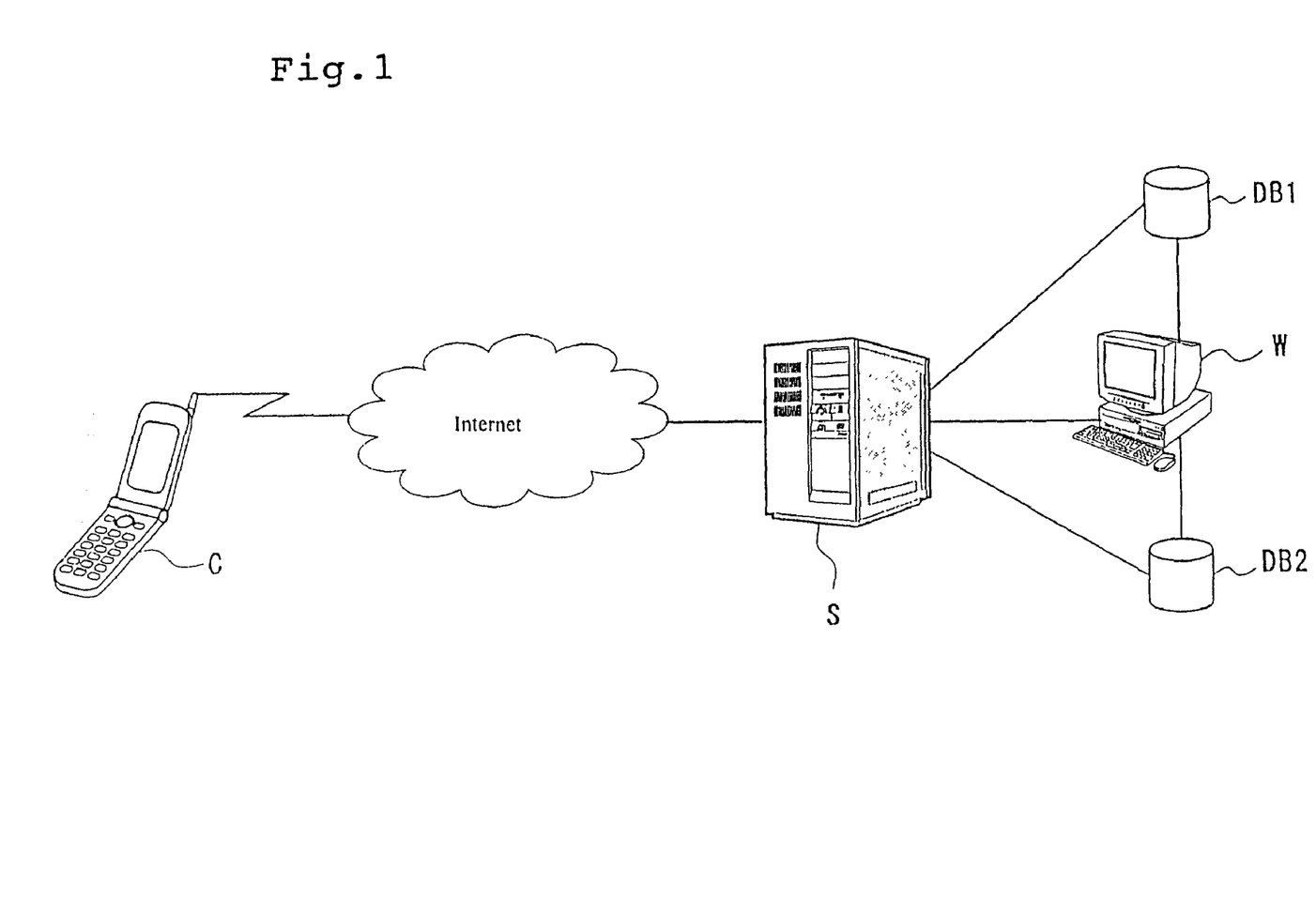
FIG. 1 is a schematic illustration of embodying for a method of supplying information for fortunetellings developed by this invention.

With reference to FIG. 1, one example of an embodiment is now explained. A cellular phone which can be connected with an internet network is now adopted as a client for the example.

A server (S) connected to the internet is equipped with a user's database (DB1) storing user's data, a fortunetelling database (DB2) storing fundamental data for fortunetelling, and a computer (W) in which the result of fortunetelling is calculated after the data of DB1 and DB2 are read. In this constitution, the computer (W) and the server (S) may be of one same composition. Such computer (W) as disclosed in Japanese Patent Laid Open No. 1995-627 calculates the fortune results of astrology by operation of horoscope method. As the fundamental data, revolving data of stars of the solar system, namely from Sun to Pluto including moon but excluding Earth, and meaningful messages of each star (for instance, Sun has the meanings of "Ego", "Light", "Paternity" and so on while Moon has the meanings of "Feelings", "Moods", "Intuitions" and so on.), as well as the revolving data of constellations of 12 zodiac and meaningful messages (for instance, Aries has "Egotistic", "Mild and Patient" and so on while Cancer has "Maternity", "Affection", "Peace of Mind" and so on) of constellations are adopted. Further, the meanings of the aspects produced by these stars and the constellations (for example, 60° means "Good Fortune for harmony" while 90° means "III Fortune for appearing as obstacles") as well as the meaningful messages of each house produced by dividing 360° circle of north, south, east and west equally into 12 portions based on east (for instance, House 1 means "Self Personality" and so on while House 2 means "One's Desire", "Belief" and so on) are adopted. These fundamental data are all stored in DB2.

The user's data stored in DB1 is the data of registered user who has accessed a fortunetelling delivery site established in the server (S) and registered, and the data are inputted by a key operation of a client (C). In this embodiment, the fortunetelling delivery site supplies astrology, based on the data registered by the user including his name, age, date of birth (hour and minute), birth of place, telephone number, and mail-address. When these user's data are registered, the fundamental data are read out from the database (DB2) based on these obtained data, and then the computer (W) performs calculation to supply the fortunetelling result based on principles of the horoscope.

If the user wants to have his fortune for the birth by the horoscope, firstly an earth is equally divided into 12 houses from east based on a place of user's birth as a center. Secondly, the distributions of the solar system are decided in view of the year, month, date, hour and minute of the user's birth, wherein what stars come in any house is decided. Further, it is decided what constellation of the zodiac which is forming a line around the equator stands against the east when user was born, and also it is decided what constellations stay in any house. By this decision, it is now calculated what stars or constellations with their own meanings come in any house with their house meanings, and how every possible phenomenon are destined under what condition. By this method, there are 12 houses, 10 stars (12 stars in some case by including a north and south node), and 12 constellations, then a total of 1440 messages can be obtained by calculation of 12×10×12. In addition, the messages produced by the aspects of the stars and constellations can be also obtained. In addition, messages of constellations and star angle are added, according to each mutual position between the stars and constellations, the degree (weighting) of meaning is differentiated. Therefore, tremendous numbers of the messages can be produced thereof. The degree of the importance can be judged in different manners in accordance with schools of the astrology or experiences and instinct of the fortunetellers. All data including these characteristics are stored in the particular database (or adding to DB2), so that the considerable number of the fortune result can be supplied in good manners.

The fortune result based on these fundamental data at fixed time can be obtained from the assembly of the messages through the connections between users' constellations, houses and the positions or angles of stars at times.

In this embodiment, when the user is registered, methods of delivering the fortune results can be selected at the time of user registration. That is to say, a setting time of delivery can be set at the fixed time everyday such as 8 o'clock in the morning, at noon and at 3 o'clock in the afternoon, at every hour, at the time of low biorhythm, or at the time of either good or ill fortune results. According to the delivery setting the server (S) proceeds to make a delivery to the client (C). In case if the delivery time is decided, in other words a setting of delivery at fixed time every day or at a fixed time interval, the computer (W) calculates the result of fortunetelling at that interval and then the server (S) can deliver the obtained result. On the other hand, when the delivery time is not decided, namely at the time of low biorhythm or at the time of ill fortune, the computer (W) is preset to perform its calculations at every 15 minutes, 30 minutes, or every hour constantly and the computer (W) judges waves of the biorhythm or bad sentence of the messages included in the results of fortunetelling, and thus the server (S) delivers the fortune result in accordance with judgment result to the client (C).

Also, in this embodiment, the client (C) is a cellular phone and performs location registration in accordance with the mobile communication system. The server (S) receives such location registration data via a base station exchanger and adds to the user's data, and thus the actual position of the client (C), namely the present position of user can be obtained at the computer (W). By adding this present position data to the user's data, correct result of the fortunetelling can be calculated on a real time basis. In other words, if latitude or longitude changes, the distribution against houses of the stars and the constellations changes accordingly. Therefore, if the setting is made to calculate the fortune results whenever the base station changes (cell movement), then it is possible to provide more accurate information for fortunetelling. Moreover, by obtainment of the location registration data, it is possible to recognize the destination (movement direction) of the user by tracing a hand-off base stations, and therefore if the user is moving toward to ill direction the server can deliver such information to the client (C). Thus, more detailed provision of fortunetelling information is possible.

When the client (C) has a GPS receiving function, the present position can be obtained directly by its function, and the client (C) offers its position data in accordance with GPS to the server (S) and the data can be referred by the computer (W). In the same way, a present position and progress direction of user is reflected in fortune results.

The fortune, results which will be delivered by a change in a fixed time or fortune are transferred to the client (C), and delivers the fortune results by a text or by image data on response of the client (C), and then the fortune results are displayed on the monitor of the client (C). From this, the user can view the last fortune passively by simply responding to the call.

The delivery of the fortune results can either be made by the text or image data and by sound. Or else, the delivery can be made by the movie file format by adding a sound data to a text and an image data. For instance, the server (S) calls the client (C), by using voice phone, the fortunetelling by synthesized speech produced by the computer (W) or the server (S) can be provided. In that case, characteristics data such as the way of speaking and tone of a voice of predetermined fortuneteller or talent is recorded into a voice memory or the data base (DB2), the sound is compounded in accordance with such data, and delivers to the client (C). On the other hand, if the client (C) has a sound file replay function such as WAVE, by delivering the sound date from the server (S) and playing the client (C), the client (C) can listen to the result of the fortunetelling as if some particular fortuneteller or the talent is speaking. The speaker can be selected by the user through the client (C), or it can be preset by the server (C) side circumstances.

When the fortune result is calculated by the computer (W), the information of congenial date of the birth are obtained, and then it is possible to search the database (DB1) whether a corresponding user's data of others are available. If there is a corresponding data and if such user registers an address as which can be represented in a public, the relative address is delivered to the client (C) and is displayed. From this, user of client (C) has a chance to meet the partner who is congenial and matching to the user at present.

From the method of providing information for the fortunetelling as described above, a flow chart of the processing performed at the server (S) side and the computer (W) is shown in FIG. 2~FIG. 5.

Figure 2:
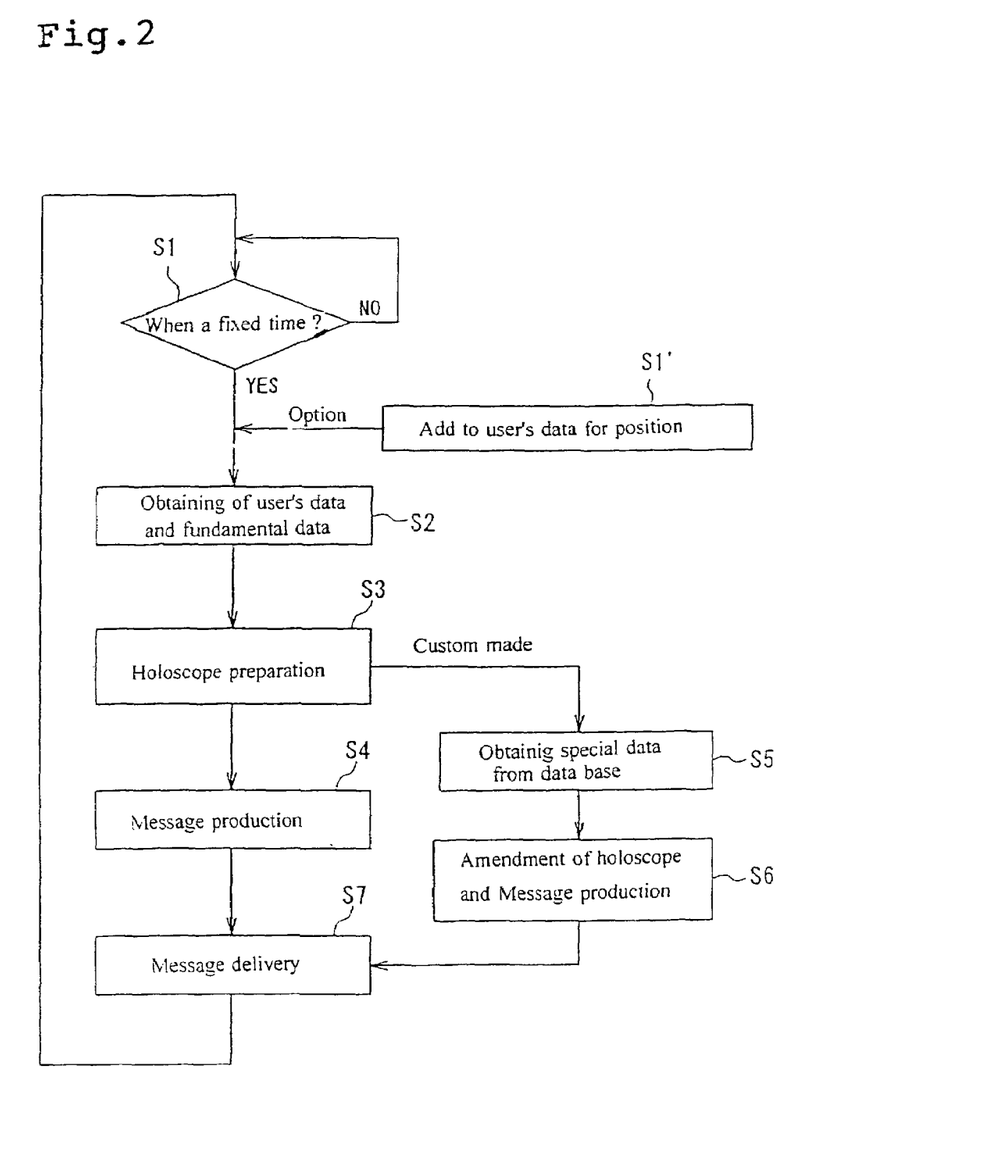
FIG. 2 is a flow chart of supplying information for fortunetellings at a fixed time.

Firstly, the FIG. 2 indicates a flow chart of the situation where computer (W) calculates the result of fortunetelling when the fixed time such as an afternoon or 3 o'clock PM is turned, and then delivery, is performed from the server (S).

The computer (W) judges the present time from an inner timer, then judges whether the time is turned to the fixed time at a STEP 1 (S1). When the fixed time comes, it proceeds to a STEP 2 (S2), and reads out the user's data and the fundamental data of fortunetelling from the database (DB1) and the database (DB2) respectively. At this moment, according to a user's optional setting, it is possible to add to the user's data by obtaining a position data of client (C) STEP S'1 (S1'). Once the required data are obtained at STEP 3 (S3) the computer (W) produces the horoscope based on the obtained data by the revolving conditions of the stars and the constellations. In the standard method, the computer (W) continues to proceed to a STEP 4 (S4), based on the produced horoscope, it extracts and combines each message stored in the data base (DB2) as the fundamental data, it produces the message for the fortune result. On the other side, in a custom-made method, the computer (W) proceeds to STEP 5 (S5) wherein it reads out the characteristic data of particular fortuneteller from the database (DB2), and at STEP 6 (S6) the horoscope is corrected with this obtained data as a variable at the same time the message is combined along with that and it produces the message for the fortune result. After the fortune result is calculated, at STEP 7 (S7), the server (S) delivers completed message to the client (C) with a text display or sound play. After the delivery is finished, the computer (W) returns to STEP 1 (S1) and waits the next fixed time.

Figure 3:
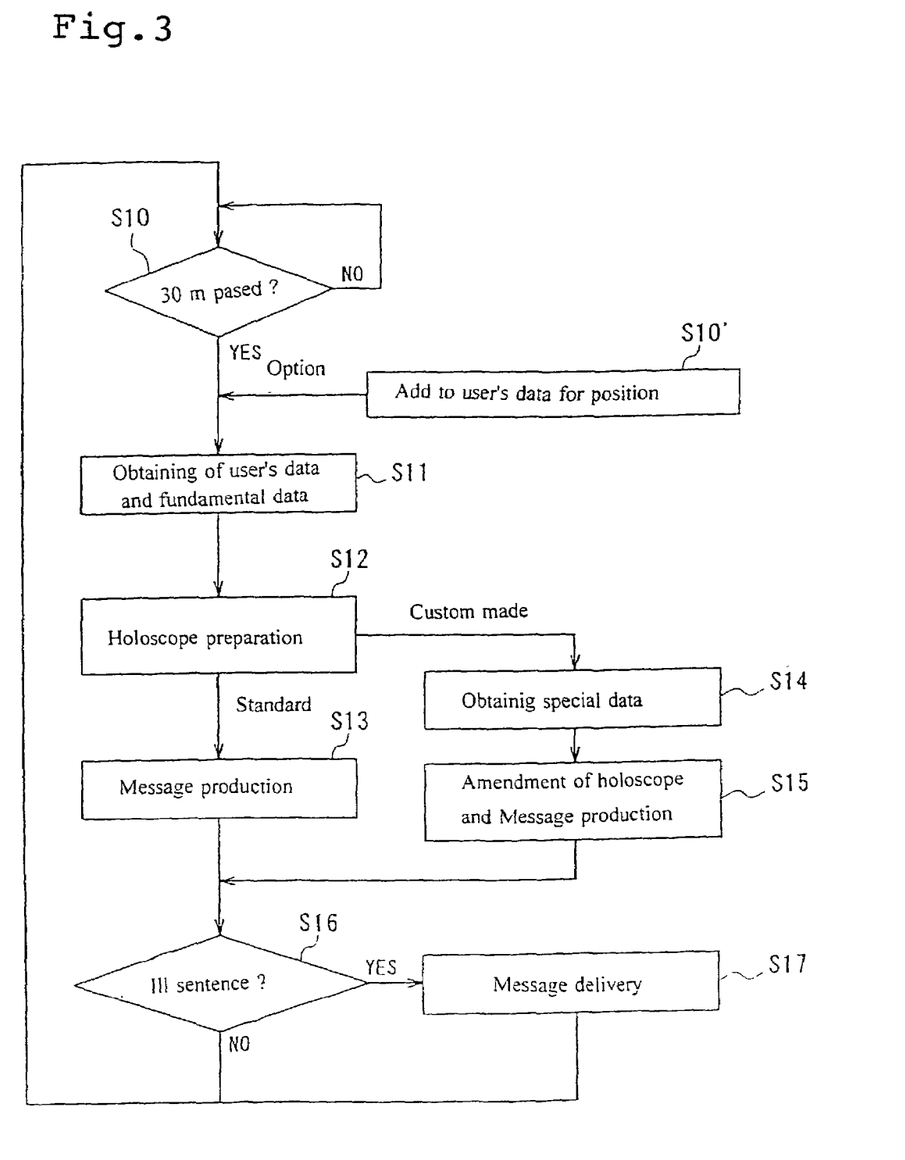
FIG. 3 is a flow chart of supplying information for ill fortunes.

With reference to FIG. 3, this flow chart shows a situation wherein the computer (W) judges the results of the fortunetelling and immediately proceeds the delivery, when the obtained results are of ill luck.

The computer (W) judges whether 30 minutes has passed or not at a STEP 10 (S10). When it confirms the 30 minutes lapse, it proceeds to a STEP 11 (S11) and the similar treatment like STEP 2 (S2)~STEP 6 (S6) in FIG. 2 is performed in subsequent STEP 11 (S11)~STEP 15 (S15). Thus, when the message for the fortune result is produced, the computer (W) proceeds to a STEP 16 (S16), wherein it judges whether the ill sentence is included in the message or not. This is possible to judge by having a process where an address or index in the database (DB2) which includes the created message corresponding to an ill is picked and tabled on beforehand, and the created fortune results is judged as an ill when more than certain numbers of corresponding are included. When the judgment by STEP 16 (S16) shows "NO", the computer (W) returns to STEP 10 (S10) to wait another 30 minutes, while when this judgment shows "YES", it proceeds to STEP 17 (S17). At this STEP 17 (S17), the message of the created fortune result is delivered to the client (C) and it returns to at STEP 10 (S10) to wait another fixed time.

Figure 4:
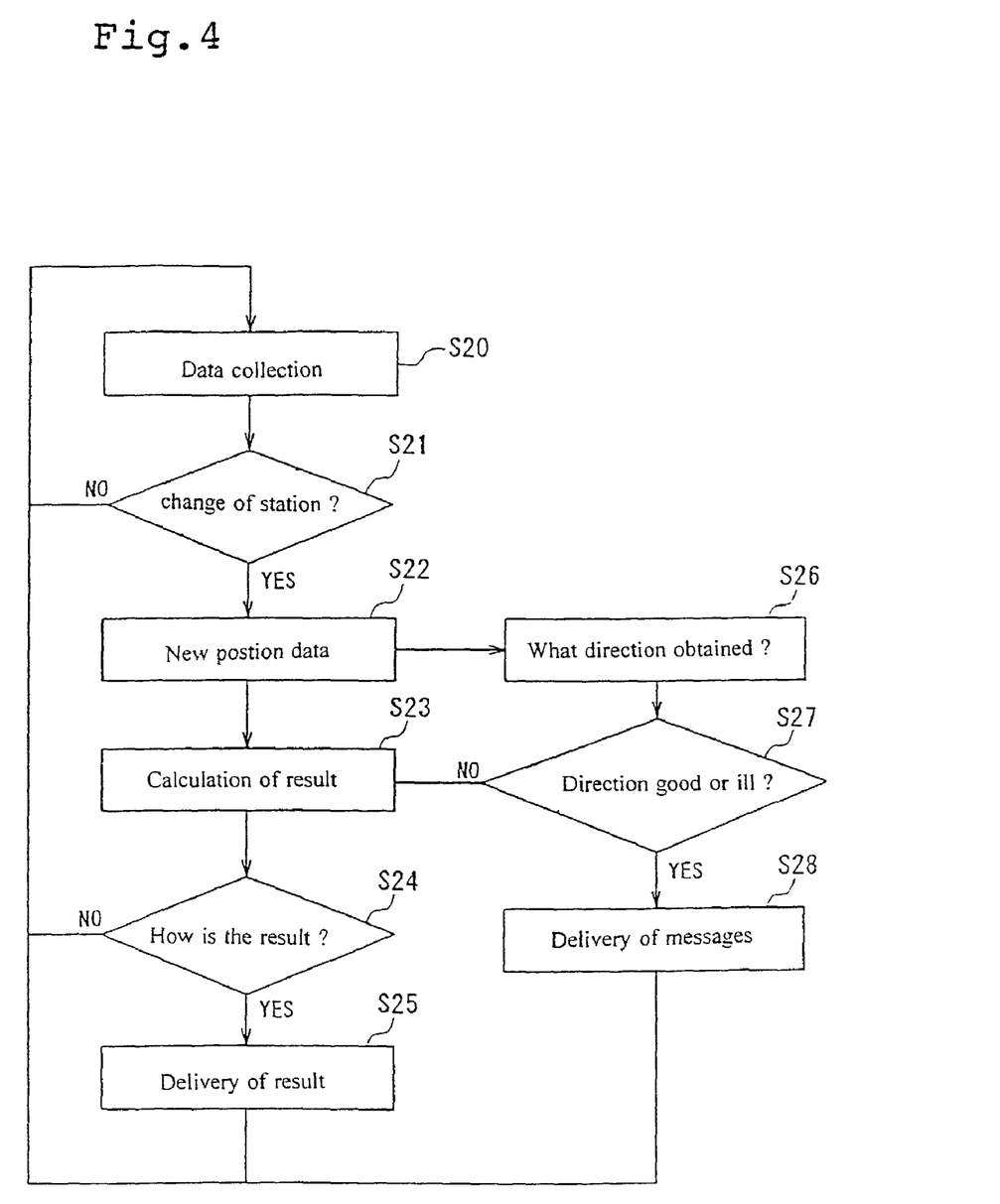
FIG. 4 is a flow chart of supplying information for ill fortunes when a user moves toward ill directions.

In reference with FIG. 4, this flow chart shows how to deliver the fortune result based on the change of user's position.

The server (S) collects the location registration data of the client (C) where the position is controlled by the exchange station of the mobile communication system at STEP 20 (S20). At STEP 21 (S21), the change of the base station (cell) due to a hand-off is checked. When the base station is not changed, the computer (W) returns to STEP 20 (S20) to collect the location registration data. On the other hand, when the base station is changed, the computer (W) records new position data into the database (DB1) and adds new position data into the user's data. Then, the computer (W), at STEP 23 (S23), calculates the fortune result based on new user's position data after it proceeds the same treatment as explained in STEP S1' (S1')~STEP S6 (S6) in FIG. 2. The obtained fortune result can be delivered as it is, but in this embodiment, the computer (W) proceeds to STEP 24 (S24) and it judges whether the fortune result becomes worse than the fortune result calculated at the previous position. This is possible by the method such as judging whether a number of sentence which corresponds to an ill included in the message was increased than before. In case if the fortune results is not worsen in comparison with before movement, the message data are only recorded in the database (DB1) and the computer (W) returns again to STEP 20 (S20). In case if the fortune results are worsen, fortune result are delivered to the client (C) from the server (S) at STEP 25 (S25), and it returns to STEP 20 (S20) accordingly.

In this embodiment, a process is combined in which the warning is provided by judging whether the user is not moving into an ill direction or not. This can be an independent flow. At STEP 22 (S22) where a new position data is obtained, the computer (W) compares the new position data with the previous position data before movement at STEP 26 (S26). At STEP 27 (S27), the computer (W) reads the results of fortunetelling which is calculated at the previous position before movement and determine directions which are considered to be an ill in those calculated fortune results, and judges whether new position corresponds to such ill directions or not. When the obtained data is not an ill direction, the computer returns at STEP 23 (S23) to calculate the fortune result. When the obtained data is an ill direction, the computer (W) proceeds to STEP 28 (S28) and delivers its message to the client (C) that the present heading direction is an ill direction and the computer (W) returns to STEP 20 (S20).

Figure 5:
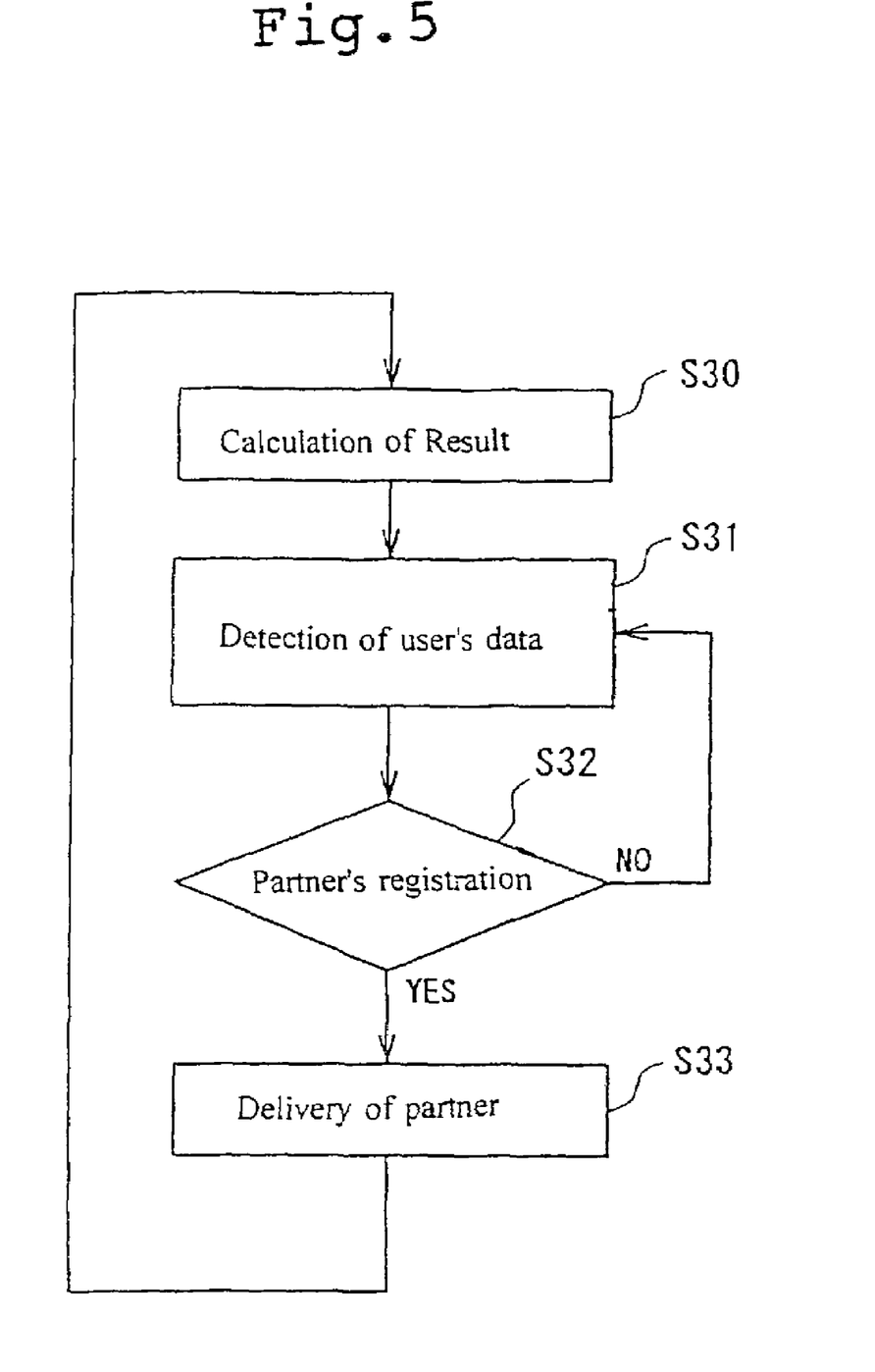
FIG. 5 is a flow chart showing information for a congeniality or compatibility checkup.

With reference to FIG. 5, the flow chart shows a congeniality checkup.

At STEP 30 (S30), after the fortune result is obtained in the procedures from FIG. 2 to FIG. 4, at STEP 31 (S31), the computer (W) checks a congenial date of birth and the place among fortune result and searches the date which corresponds to the user's data included into the database (DB1). For instance, when the message indicates a female who lives in Hamamatsu-city in Japan and whose birthday is Dec. 25, 1970 is the best congeniality in the fortune result, then the computer (W) searches whether user's data corresponding to such date of birth and place among the database (DB1). When there is a hit user's data, and at STEP 32 (S32) the computer (W) checks whether the corresponding user has chosen its contact address can be disclosed at the time of registration. If it is NO, then the computer (W) return to STEP 31 (S31) and then searches another user's data. On the other hand if it is YES, then the computer (W) proceeds to STEP 33 (S33) and then address data of best congenial user is delivered to client (C) and displayed. Accordingly, the user can contact with this best congenial user by own operation of the client (C).

According to the present invention, the user side needs not access to the site of the fortunetelling, the fortune result is delivered to the user actively by the side of the fortuneteller. This is quite different from the prior systems for the delivery of the fortunetelling. As the user side, he can receive the latest fortune result automatically at the fixed time every day or whenever the fortune gets worsen and position is changed. Thus, this is much more beneficial compared to former fortunetelling methods. Moreover, up until now there is only a lifewise fortune telling, namely fortune of the day and fortune of future such as a fortune of tomorrow. However this method enables a spatially fortunetelling, that is to say an automatically fortunetelling of a place such as a fortune of direction of future destination. Furthermore, with regard to the congeniality checking up, it will be judged from the fortune results which are produced based on an accurate horoscope of destination and place under movement. For example, the most appropriate congeniality when a joint party or match making is held in Shibuya-ku, Tokyo in Japan, and it is possible to obtain accurate and detailed fortunetelling information such as whether a company of job interview which will be held soon is expected to have a positive or negative result.

What is claimed is:

1. A method of supplying information for fortunetelling, comprising:
   a server equipped with a database storing a user's data;
   the server equipped with another database storing fundamental data of fortunetelling;
   the server equipped with a server computer for calculating results of the fortunetelling for furnishing the user's own personal astrological predictions of favorable or unfavorable events, by the fundamental data being read out based on the user's data in accordance with principles of the fortunetelling; and the computer calculating both results of fortunetelling at a fixed time, and whether a change in a user's position is favorable or unfavorable, wherein the results are delivered from the server to a client device which can be operated by a user, to inform the user when their position is moving in a favorable or unfavorable direction.

2. A method according to claim 1, wherein a user sets a time of a delivery with said server through said client device.

3. A method according to claim 1, wherein said server computer calculates the results of the fortunetelling for delivery to a client device.

4. A method according to claim 3, wherein said server delivers the results of fortunetelling whenever said server computer calculates the results.

5. A method according to claim 1, further comprising a database stored with characteristic data of a particular fortuneteller, wherein principles of fortunetelling are changed in compliance with the characteristic data via said server computer calculating the results of fortunetelling.

6. A method according to claim 1, wherein results of fortunetelling are delivered by sound to a client device via a server.

7. A method according to claim 6, wherein results of fortunetelling are played according to a characteristic data of particular character stored in a database.

8. A method according to claim 1, wherein results of fortunetelling as audio data are delivered from a server and the audio data are converted into a vocal output by said client device.

9. A method according to claim 8, wherein results of fortunetelling are played according to a characteristic data of particular character stored in a database.

10. A method according to claim 1, wherein a computer searches one user's data for compatibility with another user's data which is based on results of fortunetelling, and delivers contact data of the one user to a client device of another user, if available, to permit the another user to contact the one user.

11. A method of supplying information for fortunetelling, comprising:
   a server equipped with a database storing a user's data;
   the server equipped with another database storing fundamental data of fortunetelling;
   the server equipped with a computer calculating results of the fortunetelling for furnishing the user's own personal astrological predictions of favorable or unfavorable events, by the fundamental data being read out based on the user's data in accordance with principles of the fortunetelling; and
   wherein the computer judges whether the results show a change in a user's position are favorable or unfavorable, and the judged results are delivered from the server to a client device which can be operated by a user, to inform the user when their position is moving in a favorable or unfavorable direction.

12. A method according to claim 11, further comprising a database stored with characteristic data of a particular fortuneteller, wherein principles of fortunetelling are changed in compliance with the characteristic data via a computer calculating a results of fortunetelling.

13. A method according to claim 11, wherein results of fortunetelling are delivered by sound to a client device via a server.

14. A method according to claim 13, wherein results of fortunetelling are played according to characteristic data of particular character stored in a database.

15. A method according to claim 11, wherein results of fortunetelling as an audio data are delivered from a server to a client device, whereby the audio data is vocally reproduced or played back by said client device.

16. A method according to claim 15, wherein results of fortunetelling are played back according to a characteristic data of particular character stored in a database.

17. A method according to claim 11, wherein a computer searches one user's data for compatibility with another user's data which is based on results of fortunetelling, and delivers contact data of the one user to a client device of another user, if available, to permit the another user to contact the one user.

18. A method of supplying information for fortunetelling, comprising:
   a server equipped with a database storing a user's data;
   the server equipped with another database storing fundamental data of fortunetelling;
   the server equipped with a computer calculating results of the fortunetelling for furnishing the user's own personal astrological predictions of favorable or unfavorable events, by the fundamental data being read out based on the user's data in accordance with principles of the fortunetelling;
   a terminal of a mobile communication system used as a client device of the user;
   present user position data for the user's position by utilizing a location registration function being transferred to the server from the mobile communication system, and to be added to the user's data; and
   wherein the computer both calculates the results of the fortunetelling due to a significant change in a user's position from a previous fixed position, and judges the results of the fortunetelling, which are delivered to a client device from the server, when the user position is moving in a favorable or unfavorable direction.

19. A method according to claim 18, wherein a computer calculates results of fortunetelling when a geographic position or location of a user changes significantly from a previous fixed position.

20. A method according to claim 19, wherein a server delivers the results of the fortunetelling to a client device as a result of a user's change in location.

21. A method according to claim 18, further comprising a database stored with characteristic data of a particular fortuneteller, wherein principles of fortunetelling are changed in compliance with the characteristic data via a computer calculating a results of fortunetelling.

22. A method according to claim 18, wherein results of fortunetelling are delivered by sound to a client device via a server.

23. A method according to claim 22, wherein results of fortunetelling are played according to a characteristic data of particular character stored in a database.

24. A method according to claim 18, wherein the results of fortunetelling are delivered in the form of audio data from a server, and the audio data are vocally reproduced by a client device.

25. A method according to claim 24, wherein results of fortunetelling are played according to a characteristic data of particular character stored in a database.

26. A method according to claim 18, wherein a computer searches one user's data for compatibility with another user's data which is based on results of fortunetelling, and delivers contact data of the one user to a client device of another user, if available, to permit the another user to contact the one user.

27. A method of supplying information for fortunetelling, comprising:

a server equipped with a database storing a user's data;

the server equipped with another database storing fundamental data of fortunetelling;

the server being equipped with a computer for calculating results of the fortunetelling for furnishing the user's own personal astrological predictions of favorable or unfavorable events, by the fundamental data being read out based on the user's data in accordance with principles of the fortunetelling;

wherein a client device of the user equipped with GPS receiving function transfers present user position data to the server for addition to the user's data; and the computer both calculates the results of the fortunetelling due to a significant change in a user's position from a previous fixed position, and judges the results of the fortunetelling, which are delivered from said server to a client device, when the user position is moving in a favorable or unfavorable direction.

28. A method according to claim 27, further comprising a database stored with characteristic data of a particular fortuneteller, wherein principles of fortunetelling are changed in compliance with this characteristic data when a computer calculates results of fortunetelling.

29. A method according to claim 27, wherein results of fortunetelling are delivered via a server as audio data to a client device.

30. A method according to claim 29, wherein results of fortunetelling are played according to a characteristic data of particular character stored in a database.

31. A method according to claim 27, wherein results of fortunetelling as an audio data are delivered from a server and to a client device, whereby the client device reproduces the audio data vocally.

32. A method according to claim 31, wherein results of fortunetelling are played back according to a characteristic data of particular character stored in a database.

33. A method according to claim 27, wherein a computer searches one user's data for compatibility with another user's data which is based on results of fortunetelling, and delivers contact data of the one user to a client device of another user, if available, to permit the another user to contact the one user.

* * * * *